United States Patent
Ruigrok et al.

[11] Patent Number: 5,914,838
[45] Date of Patent: Jun. 22, 1999

[54] MAGNETIC HEAD WITH MAGNETORESISTIVE SENSOR, AND SCANNING DEVICE PROVIDED WITH THE MAGNETIC HEAD

[75] Inventors: Jacobus J. M. Ruigrok; Pieter J. van der Zaag, both of Eindhoven, Netherlands

[73] Assignee: U.S. Philips Corporation, New York, N.Y.

[21] Appl. No.: 08/792,316

[22] Filed: Jan. 31, 1997

[30] Foreign Application Priority Data

Jan. 31, 1996 [EP] European Pat. Off. .............. 96200214

[51] Int. Cl.⁶ ..................................................... G11B 5/127
[52] U.S. Cl. .............................................................. 360/113
[58] Field of Search ............................................... 360/113

[56] References Cited

U.S. PATENT DOCUMENTS

| | | | |
|---|---|---|---|
| 5,132,859 | 7/1992 | Andreacos et al. | 360/113 |
| 5,335,127 | 8/1994 | Nagata et al. | 360/113 |
| 5,471,358 | 11/1995 | Tadokoro et al. | 360/113 |
| 5,508,866 | 4/1996 | Gill et al. | 360/113 |
| 5,563,752 | 10/1996 | Komuro et al. | 360/113 |
| 5,684,658 | 11/1997 | Shi et al. | 360/113 |

OTHER PUBLICATIONS

"Mit Dunnschichtkopfen in Neue Dimensionen", by Von Mathias Krogmann, Funkschau 24/1988, pp. 37–40.

"Exchange Anisotropy in Coupled Films of $Mi_{81}FE_{19}$ with MIO and $Co_xNi_{1-x}O$", by M.J. Carey et al., Applied Phys. Lett 60 (24) Jun. 15, 1992, pp. 3060–3062.

"CoO–NiO Superlattices: Interlayer Interactions and Exchange Anisotropy with $Mi_{81}FE_{19}$ (invited)", by M.J. Carey et al., J. Appl. Phys. 73 (10), May 15,1993, pp. 6892,6894.

*Primary Examiner*—John H. Wolff
*Attorney, Agent, or Firm*—John C. Fox

[57] ABSTRACT

Magnetic head having a head face (1) and comprising a multilayer structure with a flux guide (7a, 7b), a magnetoresistive sensor (9) and an intermediate layer (13) present between the flux guide and said sensor. The intermediate layer comprises an anti-ferromagnetic oxide which insulates the sensor from the flux guide and also magnetically biases the sensor.

9 Claims, 2 Drawing Sheets

MAGNETIC HEAD WITH MAGNETORESISTIVE SENSOR, AND SCANNING DEVICE PROVIDED WITH THE MAGNETIC HEAD

BACKGROUND OF THE INVENTION

The invention relates to a magnetic head having a head face and comprising a multilayer structure with a flux guide, a magnetoresistive sensor and an intermediate layer of an insulating oxide present between the flux guide and said sensor.

A magnetic head of this type is known from Funkschau 24/1988, pp. 37–40 "Mit Dünnschichtköpfen in neue Dimensionen" Mathias Krogmann. The known magnetic head has a head face for cooperation with a magnetic recording medium and is also provided with a magnetic yoke which comprises a magnetoresistive sensor and flux guides. The magnetic yoke adjoins the head face, while said sensor is spaced apart therefrom. The magnetoresistive sensor comprises a strip-shaped element of a magnetoresistive material. When the recording medium is being scanned, the magnetic yoke is in its immediate vicinity, or is in contact with, the recording medium moving with respect to the magnetic head. Information-representing magnetic fields of the recording medium then cause changes in the magnetization of the strip-shaped element and modulate its resistance due to the effect referred to as the magnetoresistive effect. This effect implies that, due to magnetic fields, the direction of magnetization in the magnetoresistive sensor rotates, at which the electrical resistance changes. These resistance changes may be measured by a suitable detection system and converted into an output signal which is a function of the information stored in the recording medium.

Since the change of the electrical resistance of a magnetoresistive element under the influence of an external magnetic field is quadratic in this field, it is common practice to improve the operation of the magnetic head by linearizing the resistance-magnetic field characteristic. To this end, the magnetoresistive element is biased in such a way that the direction of magnetization at a signal field which is equal to zero extends at an angle of approximately 45° to the direction of the sense current through the element. In the known magnetoresistive sensor, this is realized by using an easy axis of magnetization which is parallel or substantially parallel to the longitudinal axis of the magnetoresistive element, and by an electric biasing which is achieved by means of equipotential strips of satisfactorily conducting material on the element, which strips cause a current direction at an angle of approximately 45° to the longitudinal axis of the element. The known magnetic head further has a bias winding for generating a magnetic auxiliary field parallel to the plane of the strip-shaped element and perpendicular to the easy axis of magnetization. By means of the auxiliary field, fields which are due to the sense current and influence the angle between current and magnetization, and other disturbances of the optimum angle between current and magnetization can be compensated.

Starting from a ferrite substrate, the known magnetic head is built up in layers. During manufacture, the bias winding, the magnetoresistive element, the equipotential strips and the flux guides are formed successively, while $SiO_2$ layers are provided between the substrate and the bias winding, between the bias winding and the magnetoresistive element and between the magnetoresistive element and the flux guides. These layers are required to insulate various electrically conducting layers in order to inhibit short circuits.

The known magnetic head is necessarily composed of a relatively large number of layers. This has the drawback that the manufacture of the known magnetic head is cumbersome due to the large number of deposition and structuring steps to be performed, so that the manufacturing process is time consuming and costly.

OBJECTS AND SUMMARY OF THE INVENTION

It is an object of the invention to provide a magnetic head of the type described in the opening paragraph, which can be manufactured in a limited number of process steps.

The magnetic head according to the invention is characterized in that the intermediate layer comprises an anti-ferromagnetic oxide.

The invention is based on the recognition that such an oxide, used between a flux guide and a magnetoresistive sensor, fulfils a double function, with the insulating properties of the anti-ferromagnetic oxide ensuring the required electrical separation between the flux guide and the magnetoresistive sensor, on the one hand, and generating the desired magnetic biasing of the sensor due to exchange coupling with the magnetoresistive material of the sensor, on the other hand.

The use of the intermediate layer of an anti-ferromagnetic oxide therefore reduces the number of layers required in a thin-film magnetoresistive head. It is to be noted that the anti-ferromagnetic layers hitherto used for exchange-biasing are metal layers such as FeMn, NiMn or $Tb_{0.25}Co_{0.75}$. Metals are electric conductors and therefore unsuitable for the above-mentioned application.

The intermediate layer extending between a flux guide and a sensor may be formed successfully by sputtering a suitable anti-ferromagnetic oxide such as $NiO_{1+\delta}$, with $\delta<0.05$. If desired, the intermediate layer may be built up in layers in order to obtain an intermediate layer having a relatively high resistance. To this end, a suitable deposition process comprises two process steps, in which an anti-ferromagnetic oxide is deposited at a relatively high sputtering pressure, for example 15 mTorr, in one of the process steps, while the anti-ferromagnetic oxide is deposited at a relatively low sputtering pressure, particularly smaller than 3 mTorr, in the other process step.

The magnetic head according to the invention is applicable as a read head or as a read head unit in a read/write head and may be implemented with one or more magnetoresistive sensors. The magnetic head is suitable for video, data, audio or multimedia uses. Moreover, the magnetic head according to the invention is suitable as a magnetic field sensor in, for example, medical apparatus.

An embodiment of the magnetic head according to the invention is characterized in that the anti-ferromagnetic oxide is $NiO_{1\pm\delta}$, with $\delta<0.18$, or $Ni_xCo_{1-x}O_{1\pm\delta}$, with $0.5 \leq x<1$ and $\delta=0.18$.

It has been found by experiment that an insulating separation layer of 0.15 $\mu$m is possible by means of said nickel oxide deposited by sputtering, which layer is considerably thinner than is feasible with the usual insulating oxides which are also deposited by means of sputtering. A thinner separation layer leads to a higher sensitivity of the magnetic head and thus to a larger output.

It is to be noted that exchange biasing is possible to a relatively high temperature, which is sufficiently high for normal uses, particularly 80° C. or more for the indicated nickel cobalt oxide with a cobalt fraction $\geq 0.5$ and at a layer thickness of 5 nm minimum.

It is to be noted that the use of anti-ferromagnetic oxides, particularly NiO and $Co_xNi_{1-x}O$ for biasing magnetoresistive elements is known per se from Applied Physics Letters 60 (24), Jun. 15, 1992, pp. 3060–3062; "Exchange anisotropy in coupled films of $Ni_{81}Fe_{19}$ with NiO and $Co_xNi_{1-x}O$" (herein incorporated by reference). In this publication, NiO and $Co_xNi_{1-x}O$, which are corrosion-resistant as oxides, are presented as alternatives to the anti-ferromagnet FeMn which is very sensitive to corrosion.

An embodiment of the magnetic head according to the invention is characterized in that the intermediate layer is a multilayer. A suitable multilayer is composed of, for example, a layer of $NiO_{1\pm\delta}$ ($\delta \leq 0.18$) alternating with a layer of $CoO_{1\pm\epsilon}$ ($\epsilon \leq 0.18$). At short multilayer periods ($\Lambda \leq 4$ nm), such a multilayer may give a stronger biasing at room temperature than a mixed oxide. In this connection, reference is made to Journal of Applied Physics 73 (10), May 15, 1993, pp. 6892, 6894; "CoO—NiO superlattices: Interlayer interactions and exchange anisotropy with $Ni_{81}Fe_{19}$" (herein incorporated by reference).

An embodiment of the magnetic head according to the invention is characterized in that the intermediate layer has a layer thickness of at least 5 nm. It has been found that such a layer thickness ensures that the blocking temperature, i.e. the maximum temperature at which exchange biasing still occurs, does not significantly deviate from the ordering temperature, or Néel temperature of the anti-ferromagnetic oxide. The intermediate layer may be formed by means of known deposition methods such as molecular beam epitaxy or sputtering.

An embodiment of the magnetic head according to the invention is characterized in that the flux guide is a flux guide adjoining the head face and having an interruption which is bridged by the magnetoresistive sensor and the intermediate layer. This magnetic head is a yoke-type magnetoresistive head (YMR-head). An advantage of this magnetic head is that, during use, the sensor is not in contact with a medium to be scanned. As a result, large temperature variations due to friction with the medium cannot occur. Temperature variations in the sensor may give rise to resistance variations and thus to interference signals which are referred to as thermal spikes. Moreover, in the case of an electrically conducting medium, the sensor cannot be short-circuited by this medium.

An embodiment of the magnetic head according to the invention is characterized by the presence of a further magnetoresistive sensor parallel to the first mentioned magnetoresistive sensor, the intermediate layer extending between both sensors. The stability of the sensor-unit comprising said sensors is increased considerably by proper biasing with the aid of the intermediate layer.

An embodiment of the magnetic head according to the invention is characterized by the presence of a further intermediate layer comprising the anti-ferromagnetic oxide and extending between the further magnetoresistive sensor and the flux guide.

An embodiment of the magnetic head according to the invention is characterized by the presence of a further flux guide, with the magnetoresistive sensor extending between the two flux guides, while said sensor as well as the two flux guides adjoin the head face, and the intermediate layer extends between at least said sensor and one of the flux guides and adjoins the head face. This magnetic head is a sensor-in-gap magnetic head (SIG head). An advantage of this magnetic head is that a relatively great sensitivity can be realized. In fact, the sensor is situated proximate to the medium, while there are no magnetic interruptions between the medium and the sensor. Moreover, there are no overlap areas so that the sensor may have a relatively small size and thus has a relatively high resistance and great sensitivity.

The invention also relates to a scanning device for scanning a magnetic recording medium such as a magnetic tape or magnetic disc.

The scanning device according to the invention is provided with the magnetic head according to the invention and is further provided with means for moving the recording medium relative to the magnetic head.

These and other aspects of the invention will be apparent from and elucidated with reference to the embodiments described hereinafter.

DESCRIPTION OF THE PREFERRED EMBODIMENTS

Figure 1:
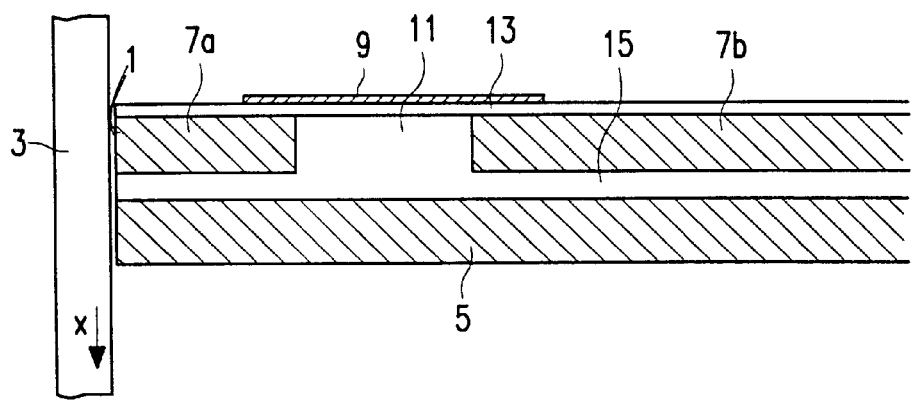
FIG. 1 is a diagrammatic cross-section of a first embodiment of the magnetic head according to the invention.

The magnetic head according to the invention, shown in FIG. 1, has a head face 1 for cooperation with a magnetic recording medium 3, such as a magnetic tape which is moved along the magnetic head in a direction x. The magnetic head is a yoke-type magnetic head and is therefore provided with a magnetic yoke. In this embodiment, the yoke comprises two flux guides 5; 7a, 7b and a magnetoresistive sensor 9. The flux guides 7a, 7b have an interruption 11 between the flux guide parts, denoted by 7a and 7b, respectively, with the magnetoresistive sensor 9 bridging the interruption 11. Likewise as the flux guide 5, the flux guide part 7a adjoins the head face 1. Said magnetic head is a thin-film magnetic head and is therefore built up in layers for which known deposition and structuring methods can be used. The flux guides 5 and 7a, 7b are formed, for example from an NiFe alloy, a CoNbZr alloy, an FeNbSi—N alloy or an FeTa—N alloy. The magnetoresistive sensor is, for example, an element formed from an NiFe alloy and provided with equipotential strips, or is a spin-valve giant magnetoresistive element composed of, for example, NiFe layers alternating with Cu layers. The sensor 9 has an easy axis of magnetization which is directed perpendicularly to the plane of the drawing. An intermediate layer 13 of an anti-ferromagnetic oxide, in this embodiment $NiO_{1\pm\delta}$ with $\delta<0.10$, is present between the magnetoresistive sensor 9 and the interrupted flux guides 7a, 7b. On the one hand, the intermediate layer 13 is used for mutually insulating the sensor 9 and the flux guide 7a, 7b and, on the other hand, for biasing the sensor 9. The intermediate layer 13 which also bridges the interruption 11 and extends from the head face 1 in this embodiment, has a layer thickness which is larger than 5 nm. In this embodiment, the intermediate layer 13 is 300 nm thick and is formed by sputtering from an NiO target in an argon plasma. Very suitable process parameters are an Ar pressure of 3 mTorr and a temperature of 200° C.

A conventional insulating oxide 15 such as $SiO_2$ or $Al_2O_3$ is present between the two flux guides 5 and 7a, 7b and in the interruption 11. Instead of a thin layer, the flux guide 5 may alternatively be a substrate of a magnetically permeable material such as ferrite, for example, NiZn ferrite.

Figure 2:
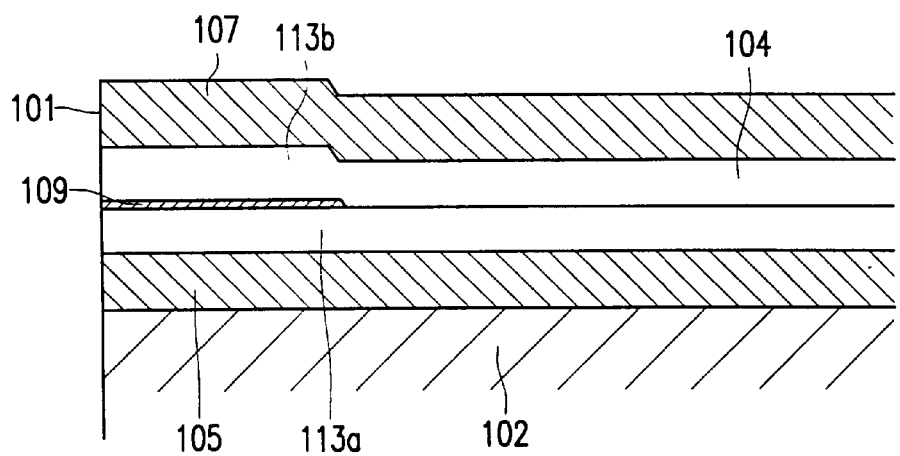
FIG. 2 is a diagrammatic cross-section of a second embodiment of the magnetic head according to the invention.

The magnetic head according to the invention, shown in FIG. 2, is a sensor-in-gap head provided with a head face 101 and a multilayer structure, particularly a thin-film structure, provided on a non-magnetic substrate 102. The multilayer structure is provided with a magnetoresistive sensor 109 and two flux guides 105 and 107 which are used, on the one hand, for guiding a magnetic flux to and from the sensor 109, which flux originates from a recording medium moving along or across the head face 101 and, on the other hand, for shielding the sensor 109 from unwanted magnetic radiation from the recording medium or its ambience. The multilayer structure is also provided with intermediate layers 113a and 113b of an anti-ferromagnetic oxide, in this embodiment $Ni_xCo_{1-x}O$ with $x \geq 0.5$, extending between the magnetoresistive sensor 109 and the flux guides 105 and 107. These intermediate layers ensure the necessary electrical separation between the sensor 109 and the flux guides 105 and 107 and also ensure an exchange biasing of the sensor 109. One of the intermediate layers may be replaced by a layer of a conventional oxide such as quartz. It is alternatively possible to use a non-magnetic oxide instead of an anti-ferromagnetic oxide at an area 104 spaced apart from the sensor 109.

To protect the multilayer structure, the magnetic heads shown in FIGS. 1 and 2 may be provided with a non-magnetic counterblock of, for example, $Al_2O_3$/TiC.

Figure 3:
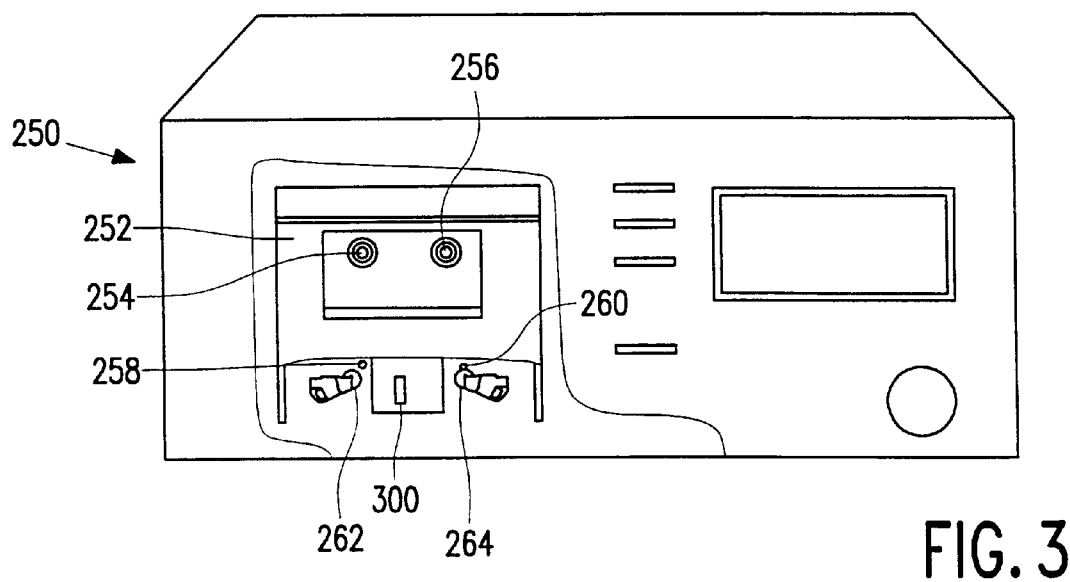
FIG. 3 is a diagrammatic, partly elevational and partly cross-sectional view of a scanning device according to the invention

The embodiment of the device according to the invention, shown in FIG. 3, is a magnetic tape apparatus 250 which is suitable for cooperation with a magnetic tape cassette. Such a cassette is provided with a magnetic tape suitable for storing analog and/or digital information. The apparatus 250, which is provided with a holder 252 for accommodating the cassette, constitutes a magnetic tape system together with the cassette. The apparatus 250 has two reel spindles 254 and 256 for cooperation with reel hubs of the cassette. When the apparatus 250 is being used, the magnetic tape is moved along a magnetic head 300 according to the invention in the apparatus 250. To this end, the apparatus shown is provided with two capstans 258 and 260, and with two pressure rolls 262 and 264 cooperating with the capstans.

Figure 4:
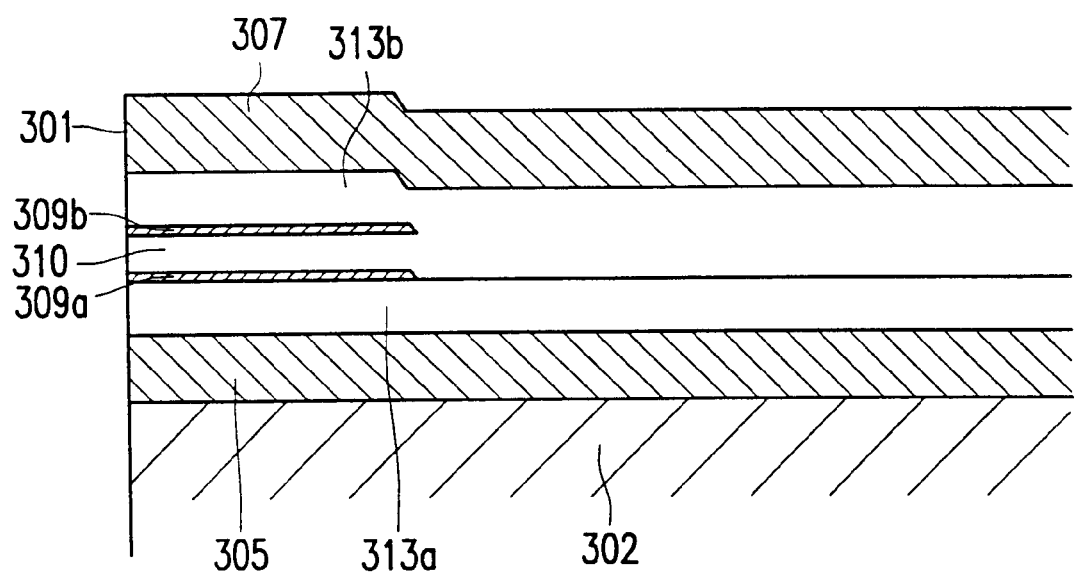
FIG. 4 is a diagrammatic cross-section of a third embodiment of the magnetic head according to the invention.

The magnetic head according to the invention, shown in FIG. 4, is a sensor-in-gap head provided with a head face 301 and a thin-film structure provided on a substrate 302, in this embodiment a non-magnetic substrate. The structure is provided with a sensor unit provided with two magnetoresistive sensors 309a and 309b, and an intermediate layer 310 extending between both sensors 309a and 309b. The layer 310 is a layer of an anti-ferromagnetic oxide, in particular in this embodiment $NiO_{1\pm\delta}$, with $\delta<0.18$, or $Ni_xO_{1-x}O_{1\pm\delta}$, with $0.5 \leq x<1$ and $\delta \leq 0.18$. The thin-film structure is also provided with flux guides or shields 305 and 307 of a magnetically permeable material, and layers 313a and 313b. Said layers 313a and 313b may be further intermediate layers of an anti-ferromagnetic oxide, being $NiO_{1\pm\delta}$, with $\delta<0.18$, or $Ni_xCo_{1-x}O_{1\pm\delta}$, with $0.5 \leq x<1$ and $\delta \leq 0.18$ or layers of an other oxide, such as $SiO_2$ or $Al_2O_3$. The layer 310 and the layers 313a and 313b may be formed by sputtering or by other methods It is to be noted that the invention is not limited to the embodiments shown. For example, the scanning device may be provided with means other than the ones shown for mutually displacing the recording medium and the magnetic head. For example, a cassette such as a data cassette may be used which is provided with an endless drive belt. In that case, the magnetic tape apparatus is not provided with capstans and pressure rolls, but with a drive roll for cooperation with a capstan in the cassette.

It is also to be noted that the invention relates to a method of manufacturing the magnetic head according to the invention. The method according to the invention is particularly characterized in that the intermediate layer is formed by sputtering an anti-ferromagnetic oxide successively at a first sputtering pressure and at a second sputtering pressure differing from the first sputtering pressure.

We claim:

1. A magnetic head having a head face and comprising a multilayer structure with a flux guide, a magnetoresistive sensor and an intermediate layer of an insulating oxide present between the flux guide and said sensor, characterized in that the intermediate layer comprises an anti-ferromagnetic oxide.

2. A magnetic head as claimed in claim 1, characterized in that the anti-ferromagnetic oxide is $NiO_{1\pm\delta}$, with $\delta<0.18$, or $Ni_xCo_{1-x}O_{1\pm\delta}$, with $0.5 \leq x<1$ and $\delta \leq 0.18$.

3. A magnetic head as claimed in claim 1, characterized in that the intermediate layer is a multilayer.

4. A magnetic head as claimed in claim 1, characterized in that the intermediate layer has a layer thickness of at least 5 nm.

5. A magnetic head as claimed in claim 1, characterized in that the flux guide is a flux guide adjoining the head face and having an interruption which is bridged by the magnetoresistive sensor and the intermediate layer.

6. A magnetic head as claimed in claim 1, characterized by the presence of a further flux guide, with the magnetoresistive sensor extending between the two flux guides, while said sensor as well as the two flux guides adjoin the head face, and the intermediate layer extends between at least said sensor and one of the flux guides and adjoins the head face.

7. A magnetic head as claimed in claim 1, characterized by the presence of a further magnetoresistive sensor parallel to the first-mentioned magnetoresistive sensor, the intermediate layer extending between both sensors.

8. A magnetic head as claimed in claim 7, characterized by the presence of a further intermediate layer comprising the anti-ferromagnetic oxide and extending between the further magnetoresistive sensor and the flux guide.

9. A scanning device for scanning a magnetic recording medium provided with a magnetic head having a head face and comprising a multilayer structure with a flux guide, a magnetoresistive sensor and an intermediate layer of an insulating oxide present between the flux guide and said sensor, the intermediate layer comprising an anti-ferromagnetic oxide, the device further provided with means for moving the recording medium relative to the magnetic head.

\* \* \* \* \*